Jan. 10, 1961    S. A. SCHERBATSKOY    2,967,933
DIP DETERMINATION

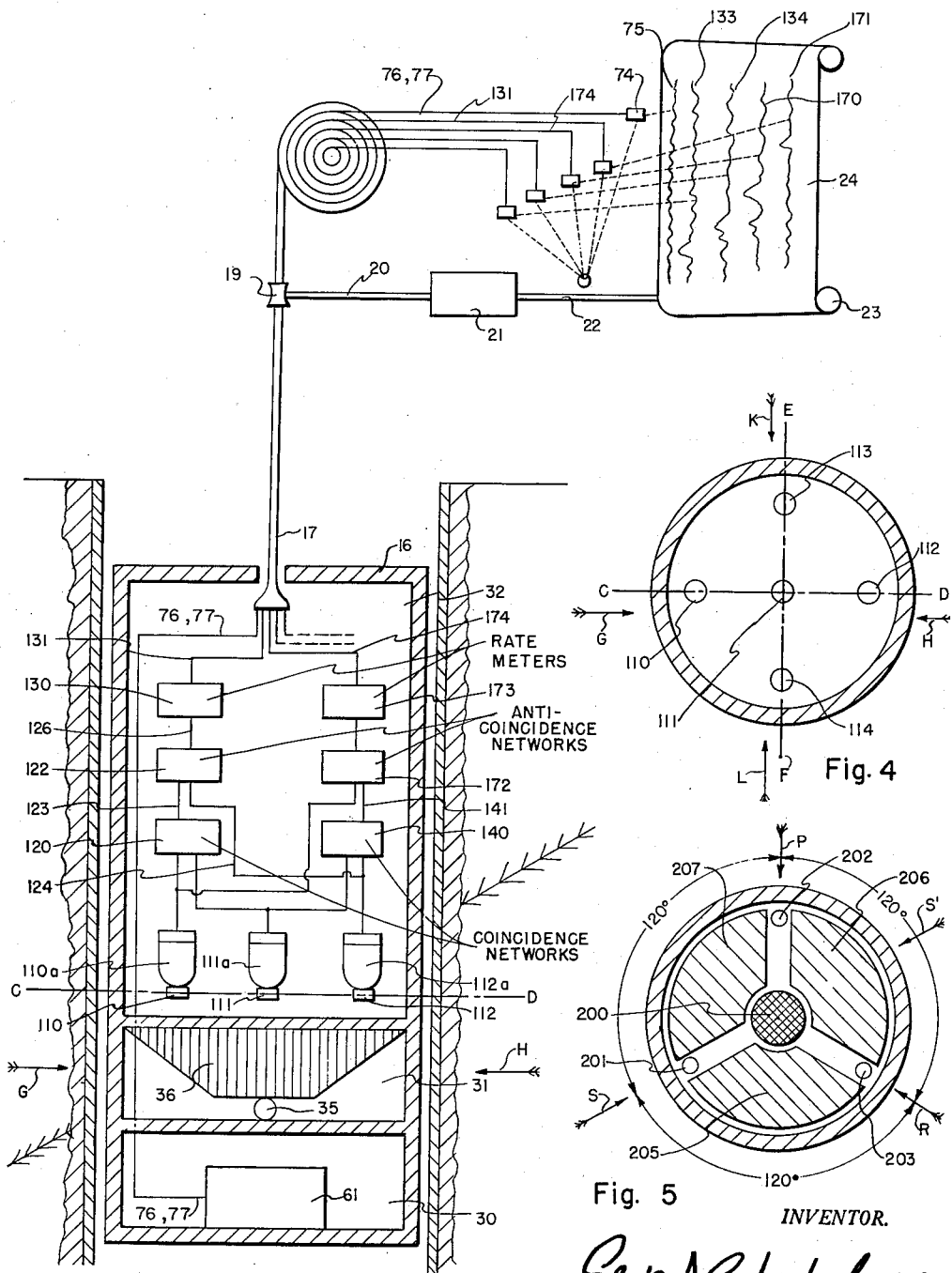

Filed Nov. 7, 1955    3 Sheets-Sheet 3

INVENTOR.
Serge A. Scherbatskoy

United States Patent Office 2,967,933
Patented Jan. 10, 1961

2,967,933
DIP DETERMINATION

Serge A. Scherbatskoy, 804 Wright Bldg., Tulsa, Okla.

Filed Nov. 7, 1955, Ser. No. 545,296

11 Claims. (Cl. 250—71.5)

This invention relates to the determination of the nature of substrata and more particularly to a method and an apparatus for measuring the inclination or dip of a formation or stratum traversed by a bore hole.

The principal object of the invention is to provide an effective way of accurately measuring the angle of inclination of a formation from within a bore hole, which may be either cased or uncased, by taking readings from an instrument lowered or raised through the hole suspended from a wire cable.

In accordance with the present invention, a source of neutrons and a plurality of crystal detectors are mounted in a suitable housing adapted to be lowered and raised through a bore hole. When the housing is placed in the hole opposite the boundary between adjacent sloping formations which react differently to neutron bombardment, the response of each crystal will depend upon the nature of the formation which is opposite that detector, and, from the simultaneous record which is made from the outputs of these detectors, the amount of inclination of the formations can be ascertained.

For a better understanding of the invention, reference may be had to the accompanying drawing in which:

Fig. 3 is a sectional elevation of the exploring housing used in the modified version of my invention.

Fig. 4 is a cross sectional view along the plane C—D shown in Fig. 3.

Fig. 5 is a sectional elevation of the exploring housing in another modified form of my invention which utilizes dissimilar crystal detectors.

Figures 1, 2:
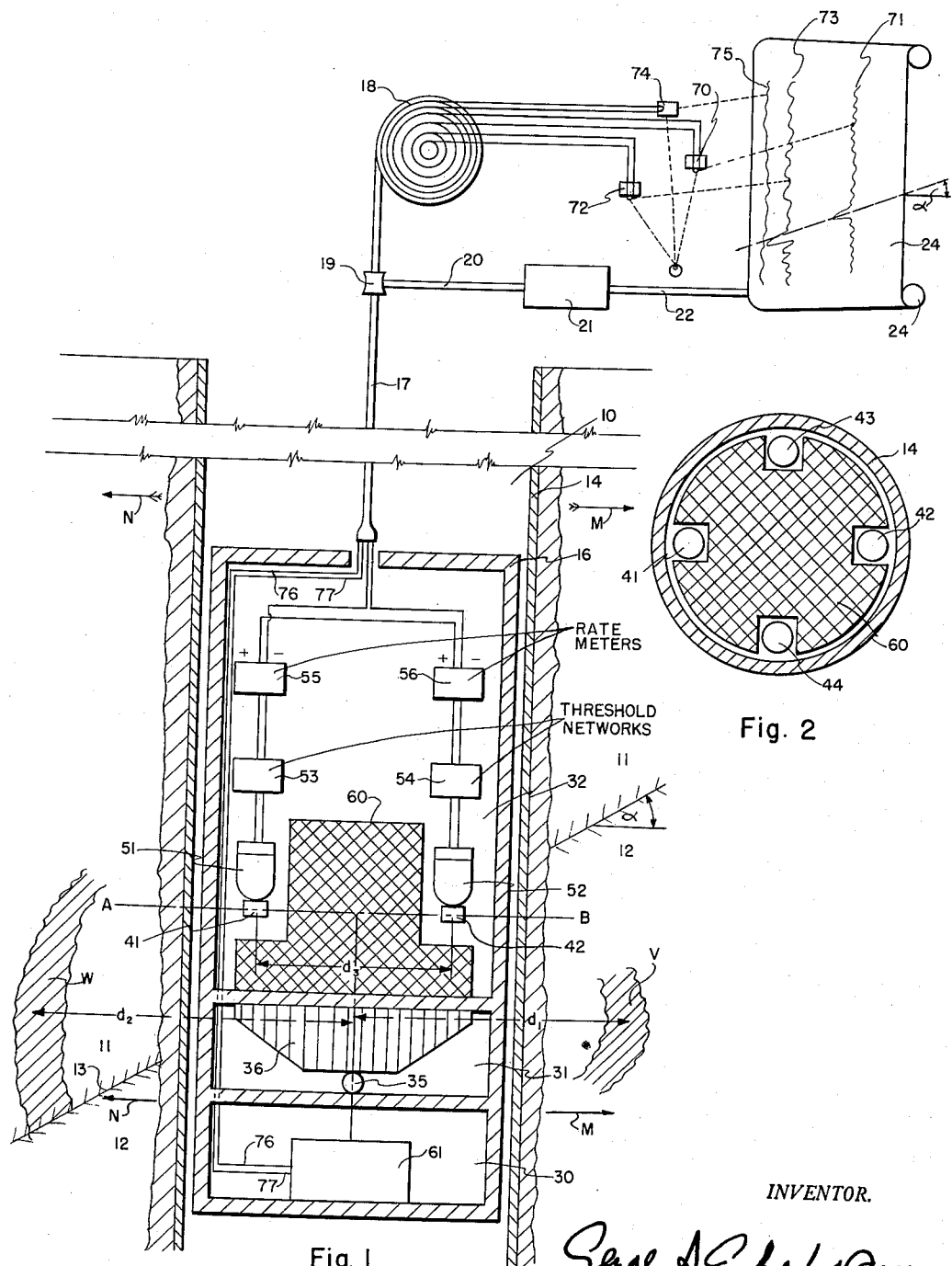
Fig. 1 is a sectional elevation through a bore hole penetrating a portion of the earth's strata.
Fig. 2 is cross sectional view along the plane A—B of the subsurface instrument of Fig. 1.

Referring now to the drawing and particularly to Fig. 1 thereof, there is schematically illustrated a drill hole penetrating several underground formations, two of which are designated as 11 and 12. The line 13 represents the intersection of the boundary separating the formations 11 and 12 and of the plane of the figure and, as shown, the line 13 is inclined with respect to the horizontal by an angle α. The drill hole is defined in the conventional manner by a tubular metallic casing 14. For the purpose of exploring the formations along the bore hole there is provided in accordance with the present invention exploratory apparatus comprising a housing 16 which is lowered into the bore hole by means of a cable 17. The cable has a length somewhat in excess of the depth of the bore hole to be explored and is normally unwound from a drum 18 to lower the exploring apparatus into the bore hole and may be rewound upon the drum 18 to raise the exploring apparatus.

In order to determine the depth of the exploratory apparatus within the bore hole 10 at any time, there is provided a measuring wheel 19 engaging the cable 17 above the top of the bore hole and adjusted to roll on the cable in such a manner that the number of revolutions of the reel 19 corresponds to the amount of cable which has moved past the reel in either direction. The reel 19 is mounted on a shaft 20 and rotation of the reel 19 and consequently of the shaft 20 is transmitted through a gear box 21 to another shaft 22 which is drivingly connected to take up spool 23 for moving photographic film 24 from a feed spool 23 to the take up spool 25.

The housing of the exploratory apparatus is divided into three sections designated by numerals 30, 31, and 32, respectively. In the section 31 there is provided a solid support on which is disposed a suitable source of neutrons, generally designated as 35 such as radium beryllium preparation, which may be enclosed in a container of a suitable material such as glass.

The radiations transmitted from the source 35 tend to propagate themselves in all directions. I have provided, however, an absorbing block 36 formed of materials for example such as lead and paraffin which is relatively opaque to penetrating radiation, the paraffin being relatively opaque to neutrons and the lead being relatively opaque to other radiations. I have therefore prevented a direct path between the source 35 and the crystals 41, 42, 43, and 44 positioned above the block 36 in the compartment 32. Fig. 1 representing the vertical cross section through the housing shows the crystals 41 and 42 while all the four crystals 41, 42, 43, and 44 are shown in the horizontal cross section shown in Fig. 2. The radiations emitted by the source 35 are directed sideways into the adjoining formations and the amount of radiations going upwards through the absorbing block is negligible.

As shown in Fig. 2, the crystals 41, 42, 43, 44 are arranged along the periphery of the inside wall of the housing 14 and are separated one from the other by a block 60 of lead or tungsten which acts as a photon absorbing shield.

The crystals 41, 42, 43, and 44 may be of anthracene, sodium iodide, or any other substance that is adapted to transform any incoming radiations such as gamma rays into impulses of light. These impulses of light subsequently impinge upon photomultipliers mounted adjacent the respective crystals and we obtain across the output terminals of the photomultipliers current impulses representing energies of the corresponding radiation quanta. In the vertical section of Fig. 1 there are shown only photomultipliers 51, 52 that cooperate with the crystals 41, 42, respectively. The outputs of the photomultiplier 51 and 52 are connected to amplitude discriminators 53, 54 which are characterized by a definite threshold and are adapted to transmit only those impulses that exceed said threshold value. This threshold value may correspond, for instance, to 2.2 mev., and in such case only those impulses that correspond to photons above 2.2 mev. are transmitted by the amplitude discriminator 53, 52. It is apparent that we may choose for the threshold value any suitable magnitude. The outputs of the discriminators 53 and 54 are respectively connected to ratemeters 55, 56, each of said ratemeters being adapted to produce across its output terminals a D.C. voltage representing the frequency of impulses applied across its input terminals. Thus we obtain across the output terminals of the meter 55 a D.C. voltage representing the frequency of arrival of those photons that are detected by the crystal 41 and that exceed in energy a value determined by the threshold of the discriminator 53. Similarly we obtain across the output terminals of the meter 56 a D.C. voltage representing the frequency of arrival of those photons that are detected by the crystal 42 and exceed in energy said threshold value.

The outputs of the meters 55 and 56 are connected in opposition and a voltage representing the difference of said outputs is applied through the cable 17 to a galvanometer mirror 70 and produces in a manner well known in the art a trace 71 representing the variation with respect to depth of the difference in the number of photons detected by the crystals 41 and 42.

In a similar manner we produce by means of the galvanometer mirror 72 a trace 73 representing the variation with respect to depth of the number of photons detected by the crystals 43 and 44.

The fast neutrons emitted by the source 35 undergo numerous collisions in the surrounding earth formation and as a result of these collisions they slow down and reach thermal velocities. In the arrangement of Fig. 1 the housing traverses an interface between two formations designated as 11 and 12. Assume that the formation 12 is porous and therefore contains a relatively large percentage of hydrogen due to the presence of water and that the formation 11 is not porous and its relative content in hydrogen is small. As stated above, $\alpha$ designates the angle between the interface line 13 and the horizontal in the plane of the figure. If $\alpha$ were zero, the bore hole would be symmetrical with respect to the surrounding formation and the process of slowing down would have been the same for neutrons emitted in the direction of the arrow M as well as for neutrons emitted in direction of the arrow N. However, as shown in Fig. 1, the inclination $\alpha$ is relatively large, and consequently, neutrons emitted in the direction M encounter the formation 12 and undergo very effective slowing down process and reach thermal velocity within a region V, distant by the amount $d_1$ from the source 35. The distance $d_1$ separating the source from the distance at which the neutrons are thermalized is designated as "slowing down distance." In the same manner, neutrons emitted in the direction of the arrow N undergo collisions in the formation 11. Since this formation contains relatively large proportion of nuclei heavier than hydrogen, the slowing down process is much less effective than in the case of the formation 12 and the neutrons become thermalized in a region W distant by the amount $d_2$ from the source 35. Thus the slowing down distance $d_2$ in the region 11 is considerably larger than the corresponding slowing down distance $d_1$ in the formation 12.

When the neutrons reach the "thermal regions" V and W in the formations 12 and 11, respectively, they do not diffuse by a substantial amount and they become captured by various elements in the regions V and W. Upon capture, these nuclei emit hard gamma rays designated as gamma rays of capture having energies between 2.3 mev. to 8 mev. Thus the region V and W become sources of radiations of hard gamma rays.

It is apparent that when $\alpha=0$, the formations are symmetrically arranged with respect to the drill hole and $d_1=d_2$, i.e. the radiation sources V and W are equidistant from the bore hole. However, if $\alpha \neq 0$ and the inclination is relatively large, we obtain a situation illustrated in Fig. 1 in which $d_1$ is smaller than $d_2$. It is our purpose to determine the difference of the values $d_1$ and $d_2$ and obtain thus an index representing the inclination $\alpha$.

In order to accomplish the above purpose, I provide in the drill hole a crystal detector 42 which is responsive mainly to the source V and irresponsive to the source W and a crystal detector 41 which is responsive mainly to the source W and irresponsive to the source V. Let $d_3$ designate the distance between the detectors 41 and 42. It is apparent that the detector 42 is more responsive to the source V since it is located at a distance $d_1$ from this source, whereas the detector 41 is located at a distance $d_1+d_3$ is considerably larger than $d_1$. Furthermore, the detector 41 is considerably less responsive to the source V because of the lead shield 60 interposed between the detectors 41 and 42. It can be shown that for similar reasons the detector 42 is considerably less responsive to the source W than the detector 41.

It is apparent that a portion of gamma rays emitted by the sources V and W arrive directly at the detectors 42 and 41 without undergoing any scattering. This direct, unscattered radiation does not suffer any degradation of energy and consists of the original gamma rays of capture having energy within the range of 2.3 mev. to 8 mev. However, the remainder of radiations emitted by the sources V and W undergoes numerous scatterings and consequent energy degradation before it reaches the detectors V and W, respectively.

It is our purpose to obtain a clear and unambiguous index of the distances $d_1$ and $d_2$ and for this reason we prefer to receive only those unscattered radiations that are directly emitted by the sources V and W. For this reason we provide radiation detectors 41 and 42 that give impulses proportional to energy of intercepted photons and by providing the threshold networks 53 and 54 we eliminate the degraded impulses corresponding to energies below 2.2 mev. and originated by the scattered radiation that it is desired to eliminate.

It is apparent that the networks 53 and 54 may be designed so as to have a threshold of different magnitudes than 2.2 mev. Our purpose is to exclude from the recording relatively weak gamma rays since they originate immediately adjacent the bore hole. It is well known that photons of lower energy originate within the layer adjacent to the bore hole and having a thickness of the order of magnitude of the mean free path of said photons. Thus by eliminating these low energy photons we detect only those photons that originate at larger distances from the bore hole. The magnitude of this distance depends on the value of threshold which may correspond, for instance, to 0.01 mev., 0.1 mev., 1 mev., etc.

If it is desired to determine both the strike and the inclination or dip of a formation such as the formations 12 and 13, this can be done in various ways such as by the use of a gyroscope and angle transmitting device 61 in the compartment 30 of the housing, said gyroscope to serve as a directional reference and arranged to transmit to the surface of the ground an indication of the angular position of the instrument 16 around its axis. Such indication can be, for example, with respect to true north and would be transmitted to the surface by wires 76 and 77 and indicated by the mirror 74 on trace 75.

It should be understood that the source of primary radiations may be arranged to shield either gamma radiation, fast neutrons, slow neutrons, or any combination of the three types of radiation, or conceivably, any other type of radiation capable of penetrating into the formation under observation. The detectors may similarly be arranged to detect and measure any type or combination of types of incident radiation. For example, the primary source of radiations, in the present arrangement is designed to emit mostly fast neutrons and the detectors to be sensitive mainly to gamma radiation. The detectors may be designed, however, so as to detect slow neutrons to the exclusion of other radiation, or to detect fast neutrons to the exclusion of other radiation. In order to detect slow neutrons, the crystals 41, 42, 43, 44 should be made of lithium iodide or any other scintillating substance that reacts with thermal neutrons.

In the embodiment of Figs. 1 and 2 the detectors 41, 42, 43, and 44 were non-directional, i.e. they had equal sensitivity to radiation inocming from all directions. The differential response of the detectors, such as 41 and 42 to radiations incoming along the directions perpendicular to the bore hole and originated in the thermal regions W and V, respectively, was achieved because of the following factors:

(1) Small dimensions of the radiation detectors as compared to the diameter of the hole. This requirement makes the use of scintillation counters particularly desirable. The conventional Geiger counters used in the prior art were considerably larger than the crystals used in scintillation counters.

(2) The presence of a shield 60 which limits the response of the detectors to radiations arriving along certain selected directions.

Figs. 3 and 4 show another embodiment of my invention utilizing directional detectors. The directivity of the reception is obtained by aligning two or more crystals along the desired direction and selecting only those gamma radiations that produce coincident pulses in said crystals. This principle of directional reception has been described in my copending U.S. patent application Serial No. 399,972.

Fig. 1 and Fig. 3 have certain elements that are the same in both arrangements and these elements have been designated by the same numerals in both figures. In particular, the various elements comprised in the compartments 30 and 31 of the housing 16 are identical in Fig. 1 and Fig. 3. As shown in Fig. 4, I provided in the compartment 32 directly above the shield 36 three crystals designated as 110, 111, and 112 aligned along the direction CD and three crystals designated as 113, 111, and 114 aligned along the direction EF. The central crystal 111 is common to both alignments. The crystals are of scintillating type such as sodium iodide crystals and they are adapted to produce light impulses as a result of interaction with the incoming gamma rays. The crystals 110, 111, and 112 cooperate with the photomultipliers 110a, 111a, and 112a, each of said photomultipliers producing across its output terminals a current impulse coincident with an incident photon, or other nuclear particle interacting with said crystal. It is noted that in the circuit diagram of Fig. 3 various electrical leads are designated by single wires (for the sake of clarity), whereas in Fig. 1 each lead has been designated by two wires. The output leads of photomultipliers 110a and 111a are connected to a coincidence network 120, said coincidence network providing across its output leads a current only if the photomultipliers 110a and 111a are simultaneously energized, and this happens when the incoming photon produces simultaneous light flashes in the crystals 110 and 111. As explained in my aforementioned copending application Serial No. 399,972, such a situation takes place if the incoming photon follows the trajectory CD and arrives from the direction indicated by the arrow G or from the direction indicated by the arrow H.

It is apparent that most of the time an impulse in the output of the coincidence network 120 signifies that the incident gamma ray has the direction G, because a gamma ray arriving along the direction H has a very high probability of interacting with the crystal 112. For this condition, most of the time the network 120 is not energized. It is our objective to exclude entirely those gamma rays that arrive along the direction H, and for this purpose I have provided an anticoincidence network 122 having its input lead 123 connected to the network 120 and its input leads 124 connected to the output of the photomultiplier 112a. The anticoincidence network 122 produces across its output terminals 126 an impulse upon the occurrence of an impulse across the leads 123, but only then when said impulse across the leads 123 is not accompanied by another impulse across the leads 124.

It has been explained above in connection with Figs. 1 and 2 that it is desired to exclude from the recording relatively weak gamma rays since they originate immediately adjacent to the bore hole and for this purpose I have provided in Fig. 1 threshold networks 53 and 54 that tranmit only those impulses that originate at larger distances from the walls of the hole. A similar filtering arrangement eliminating low energy photons exists also in the arrangement of Fig. 3; namely, low energy photons arriving along the direction G are absorbed in the crystal 110 and therefore do not produce simultaneous pulses across the photomultipliers 110a, 111a, and therefore there is no impulse across the output leads 126 of the network 122.

Consider now medium energy photons arriving along the direction G. Each of these photons undergoes Compton interaction in the crystal 110 thereby producing a scattered photon that is completely absorbed in the crystal 111. Consequently, both photomultipliers 110a and 111a are simultaneously energized and we obtain an output pulse in the network 120. Since the scattered photon is completely absorbed in the crystal 111 there is no occurrence of a pulse in the photomultiplier 112a. Therefore the impulse at the lead 123 is not accompanied by an impulse at the lead 124 and the anticoincidence network 122 is energized producing an impulse at the lead 126.

On the other hand, if a high energy photon arrives along the direction G or H all three photomultipliers 110a, 111a and 112a are simultaneously energized. We obtain a pulse at the leads 123 and 124, and therefore the anticoincidence network 122 is not energized and there is no occurrence of a pulse across the leads 126.

It is thus apparent that we obtain across the leads 126 a pulse only if medium energy photons arrive along the direction G. The leads 126 are connected to a rate meter 130 and we thus obtain across the output leads 131 a D.C. voltage representing the frequency of occurence of medium energy photons arriving along the direction G. This signal is in turn transmitted through the cable 132 to the top of the drill hole and we obtain in a manner well known in the art a trace 133 representing the variation of this signal with respect to depth of the drill hole.

Figs. 3 and 4 contain also a provision for obtaining the records 133, 134, 170, and 171 of the frequency of occurrence of medium energy photons arriving from the directions G, H, K, and L. To obtain the record corresponding to the direction L the output of the photomultipliers 111a and 112a are applied to a coincidence network 140 having its output leads 141 applied to an anticoincidence network 172, the other input terminal of said anticoincidence network being connected to the photomultiplier 110a. It is apparent that for the same reasons as those explained hereinabove, we obtain in the output of the anticoincidence network 172 a pulse when, and only when, a medium energy photon arrives along the direction. The output of the anticoincidence network 172 is applied to a rate meter 173 the output of which is transmitted through the leads 174 to the top of the drill hole and is recorded in form of a trace 134, said trace representing the variation in intensity of gamma rays incident along the direction H.

It is apparent that in the same manner as hereinabove we obtain traces 170 and 171 representing the intensities of the incident photons arriving along the directions K and L.

Fig. 5 represents the horizontal cross section of the exploring housing (similar to the ones shown in Figs. 2 and 4) of a modified embodiment of my invention. In this modified embodiment I measure separately the rate of incidence of gamma rays arriving along the directions P, R, and S. The directions are in the plane of Fig. 5 perpendicular to the axis of the drill hole, the direction R being inclined with respect to P by 120° and similarly P is inclined with respect to S by 120°. As shown in Fig. 5, the housing contains a central scintillating crystal 200 relatively large in size and having very large density such as cadmium tungstate and three peripheral crystals 201, 202, and 203, small in size and less dense, such as anthracene or sodium iodide, said crystals being aligned with respect to the central crystal 200 along the direction S, P, and R, respectively. In the space between the crystals 200, 201, 203, I provide a lead shield 205. Similarly a lead shield 206 is provided in the space between the crystals 200, 202, 203 and a shield 207 is provided in the space between the crystals 200, 201, and 202. The presence of the lead shield is not essential, but in some instances it may improve the results.

Figure 6:
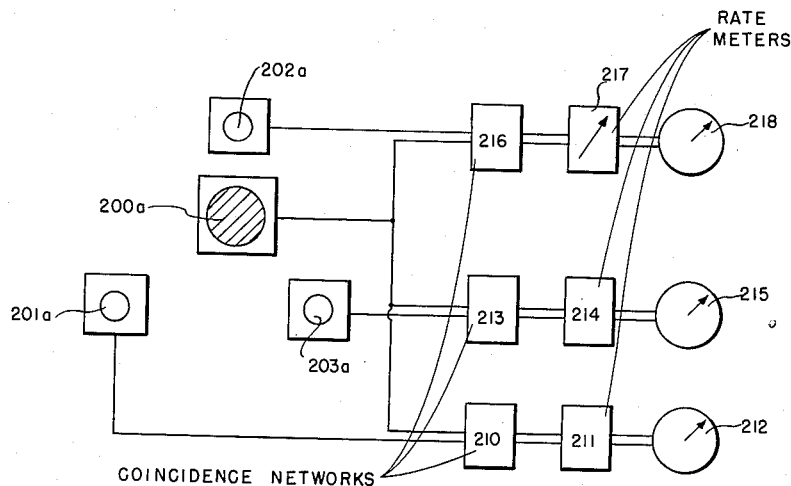
Fig. 6 shows diagrammatic the principle of operation of the arrangement of Fig. 5.

It is apparent that an incident photon arriving along the direction S may undergo Compton scattering in the crystal 201, thus producing a flash of light due to the released Compton electron. The size of the crystal 201 is not too large so that no subsequent scattering takes place within this crystal, i.e. a single Compton interaction takes place. As a result of this interaction the scattered photon leaves the crystal 201 in the direction of the arrow S and undergoes the next and all subsequent interactions within the crystal 200. The crystal 200 is large and of high density, and therefore it absorbs completely the photon scattered by the crystal 201. The crystals 201 and 200 are associated with photomultipliers which produce therefore two coincident current impulses upon the arrival of a photon from the direction S. We apply the outputs of these photomultipliers to a coincidence network 210 in a manner explained hereinabove. This is indicated diagrammatically in Fig. 6 in which the numerals 200a, 201a, and 201b designate the crystals in conjunction with photomultipliers. The coincidence network 210 is in turn connected to the rate meter 211, the output of which is indicated on the meter 212. Thus the meter 212 indicates the rate of arrival of photons along the direction S. Consider now photons arriving along the direction S' opposite to the direction S. These photons are attenuated by the shield 206. Therefore, they do not interact with the crystals 200, 201, and have no effect on the meter 212. In some instances we may eliminate the shield 206 and still preserve the directional characteristic of the system which is responsive only to the direction S and not responsive to the direction S'. Under these conditions, i.e. in the absence of the shield 206, a photon arriving along the direction S' interacts with the crystals 200 and undergoes multiple Compton collisions within the crystal. As a result of these collisions, a flash of light is produced within the crystal 200. Since this photon is completely absorbed within this crystal the coincidence network 210 remains unenergized and the indication of the meter 212 is not affected. Consequently the meter 212 indicates the frequency of arrival of photons along the direction S and it is insensitive to any other direction, including the direction S'.

In a similar manner, it can be shown that the meter 215 indicates the frequency of arrival of only those photons that have the direction R and the meter 218 indicates the frequency of arrival of only those photons that have the direction P.

Figure 8:
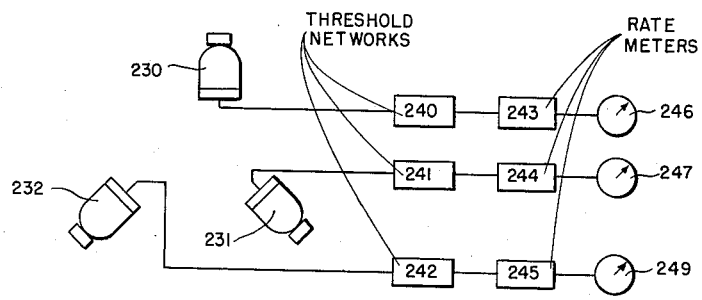
Fig. 8 shows diagrammatically the principle of operation of the arangement of Fig. 7.
Figure 7:
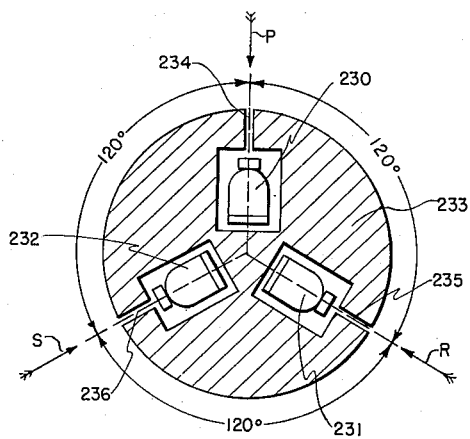
Fig. 7 is a sectional elevation of the exploring housing in another embodiment of my invention utilizing three directional gamma ray detectors.

Fig. 7 shows the horizontal cross section of the exploring housing (similar to the one shown in Figs. 2, 4, and 5) of another modified form of my invention in which I measure separately the rate of incidence of gamma rays arriving along the directions P, R, and S, respectively. As shown in Fig. 5, the housing contains three detectors 230, 231, and 232 imbedded in a lead shield 233. The shield will absorb all incident photons except those arriving along the narrow elongated openings 234, 235, and 236, aligned in the directions P, R, and S, respectively. Because of these openings, only very narrow beams of gamma rays aligned along the directions P, R, and S are arranged to interact with the crystals of the detectors 230, 231, and 232. Each of these crystals is sufficiently large so as to absorb completely the incident photons and to produce a light flash having the intensity proportional to the energy of the gamma ray. We thus obtain across the output terminals of the photomultipliers associated with the detectors 230, 231, and 232 current impulses having magnitudes proportional to the energies of incident photons. As shown in Fig. 8 and explained hereinabove, these current pulses are applied to the threshold networks 240, 241, 242 and we obtain thus across the output terminals of these networks only those current impulses that exceed a determined threshold value. These current impulses are applied to the rate meters 243, 244, and 245 which have their outputs indicated on the meters 246, 247, and 248, respectively. We thus obtain on the meters 246, 247, 248 indications of those photons that exceed in energy a determined threshold value and that arrive at the detectors 230, 231, and 232 along a selected direction P, R, and S.

I claim:

1. The method of surveying a bore hole, comprising irradiating the formations surrounding said hole with neutrons, whereby photons are produced in said formations as a result of interaction of said formations with neutrons, selectively detecting photons returning to said hole from a predetermined direction, measuring the occurrence rate of such photons having energy characteristic of undegraded gamma rays of capture, and repeating said selective detection and measurement for other known depths in said hole.

2. An instrument for use in determining the dip of an underground formation traversed by a bore hole comprising a housing adapted to be lowered and raised through said hole, a directional detector in said housing, said detector being adapted to respond selectively to incident gamma rays arriving along a determined direction and to produce current impulses having magnitudes representing the energies of said gamma rays, a threshold network adapted to transmit selectively those impulses that exceed a determined threshold value, means of determining the depth to which said housing is lowered in said hole, and means for recording the output of said threshold network in correlation with said depth.

3. In an apparatus for ascertaining the direction and sense of incident photons, a relatively small detecting element adapted to interact with an incident photon in such a manner that a secondary photon released as a result of said interaction escapes from said element, a relatively large detecting element adapted to interact with an incident photon in such a manner that a secondary photon released as a result of said interaction is absorbed by said large detecting element, said two elements being mounted in alignment along a reference direction and being spaced apart a determined distance one from the other, first means associated with said small detecting element for producing an electrical impulse coincident with the interaction of an incident photon with said small element, a second means associated with said large detecting element for producing an electrical impulse coincident with the interaction of an incident photon with said large element, a coincidence circuit connected to said first and second means for producing an output pulse whenever current pulses produced by said two means occur in substantial coincidence, and an indicator connected to said coincidence circuit.

4. In an apparatus for ascertaining the direction and sense of incident photons, a relatively small crystal adapted to interact with an incident photon in such a manner that a secondary photon released as a result of said interaction escapes from said crystal, a relatively large crystal adapted to interact with an incident photon in such a manner that a secondary photon released as a result of said interaction is absorbed by said large crystal, said two crystals being mounted in alignment along a reference direction and being spaced apart a determined distance one from the other, each of said crystals being adapted to produce a flash of light in response to a photon interacting with the same, and being also provided with a photomultiplier tube and a voltage supply therefor, said photomultiplier being operative to produce a current impulse responsively to each flash of light in the crystal therewith associated, a coincidence circuit connected to said photomultipliers for producing an output pulse whenever current pulses produced by said two photomultipliers occur in substantial coincidence, and a counting-rate circuit connected to said coincidence circuit.

5. The method of determining the dip of an underground formation traversed by a bore hole which comprises bombarding the formations surrounding a portion of the hole with neutrons, whereby gamma-ray photons of capture are emitted by the material in said formations as a result of interaction of said neutrons therewith, selectively detecting from among the photons returning to said hole along a specific direction in a plane predetermined relative to the axis of said hole those photons having energies in a predetermined range above 2.2 mev., similarly selectively detecting such photons returning to said hole from the opposite direction in said plane, measuring the relative frequency of occurrence of said two sets of selected photons, and comparing such relative frequencies as a function of depth in said hole to ascertain when the formations adjacent said hole in the first of said directions differ in character from the formations adjacent said hole in said opposite direction.

6. The method defined in claim 5 comprising the additional step of determining the absolute azimuth of said first and second directions.

7. The method of determining the dip of underground formations traversed by a bore hole comprising the steps of bombarding the formations surrounding the hole at a known depth with neutrons, whereby gamma rays of capture are emitted by the material in said formations as the result of interaction of said neutrons therewith, detecting gamma rays returning to said bore hole along a plurality of specific directions in a plane predetermined relative to the axis of said hole and producing impulses having magnitudes corresponding to the respective energies of said rays, the impulses corresponding to rays from each of said directions being separately collected, transmitting those impulses corresponding to rays from each of said directions having energies above a predetermined value of at least 2.2 mev., measuring the relative frequency of occurrence of said transmitted impulses for each of said directions, repeating the foregoing steps for different depths in the bore hole, and comparing such frequencies of occurrence as a function of depth in said hole.

8. The method of claim 7 which comprises the additional step of determining the absolute azimuth of each of said directions.

9. The apparatus of claim 3 having also shield means disposed alongside the direct path between said small detecting element and said large detecting element, defining a relatively narrow unobstructed path between said elements and operative to attenuate radiation impinging on said apparatus along directions other than said reference direction.

10. In an apparatus for ascertaining the direction and sense of incident photons, a pair of relatively small detecting elements respectively adapted to interact with incident photons in such a manner that a secondary photon released as a result of said interaction escapes from said element, a relatively large detecting element adapted to interact with an incident photon in such a manner that a secondary photon released as a result of said interaction is absorbed by said large detecting element, one of said small elements and said large element being mounted in alignment along a first reference direction and being spaced apart a determined distance one from the other, the other of said small elements and said large element being disposed in alignment along a second reference direction and being spaced apart a determined distance one from the other, first means associated with one of said small detecting elements for producing an electrical impulse coincident with the interaction of an incident photon with said small element, a second means associated with said large detecting element for producing an electrical impulse coincident with the interaction of an incident photon with said large element, a third means associated with said other small detecting element for producing an electrical impulse coincident with the interaction of an incident photon with said other small element, a first coincidence circuit connected to said first and second means for producing an output pulse whenever current impulses produced by said two means occur in substantial coincidence, a second coincidence circuit connected to said third means and said second means for producing an output pulse whenever current impulses produced by said third means and said second means occur in substantial coincidence, and indicating means respectively connected to each of said coincidence circuits.

11. The apparatus of claim 10 having also shield means disposed adjacent said detecting elements defining relatively narrow unobstructed paths between each of said small elements and said large element along said respective reference directions and operative to attenuate radiation impinging on said apparatus from directions other than said reference directions.

References Cited in the file of this patent

UNITED STATES PATENTS

| | | |
|---|---|---|
| 2,464,930 | Herzog | Mar. 22, 1949 |
| 2,648,012 | Scherbatskoy | Aug. 4, 1953 |
| 2,659,011 | Youmans et al. | Nov. 10, 1953 |
| 2,711,482 | Goodman | June 21, 1955 |
| 2,739,242 | Armistead | Mar. 20, 1956 |
| 2,769,096 | Frey | Oct. 30, 1956 |